United States Patent [19]

Couput et al.

[11] Patent Number: 5,276,547
[45] Date of Patent: * Jan. 4, 1994

[54] ELECTROCHROMIC ELEMENT, MATERIALS FOR USE IN SUCH ELEMENT, PROCESSES FOR MAKING SUCH ELEMENT AND SUCH MATERIALS AND USE OF SUCH ELEMENT IN AN ELECTROCHROMIC GLASS DEVICE

[75] Inventors: Jean P. Couput, Bizanos; Guy Campet, Canejan; Jean M. Chabagno, Pau; Daniel Muller, Pau; Maurice Bourrel, Pau, all of France; Ryan Dirkx, Belle Mead, N.J.; Didier Ferry, Pau, France; Regine Garie, Biarritz, France; Claude Delmas, Talence, France

[73] Assignees: Elf Atochem North America, Inc., Philadelphia, Pa.; Societe Nationale Elf Aquitaine, Paris, France; a part interest

[*] Notice: The portion of the term of this patent subsequent to Feb. 4, 2009 has been disclaimed.

[21] Appl. No.: 814,797

[22] Filed: Dec. 31, 1991

Related U.S. Application Data

[62] Division of Ser. No. 379,225, Jul. 13, 1989, Pat. No. 5,086,351.

[51] Int. Cl.⁵ .......................... G02F 1/01; G02F 1/03
[52] U.S. Cl. .................................. 359/270; 359/265; 359/269; 429/192
[58] Field of Search .................. 359/270, 265, 269; 429/192

[56] References Cited

U.S. PATENT DOCUMENTS

| | | | |
|---|---|---|---|
| 3,451,741 | 6/1969 | Manos | 359/275 |
| 4,006,966 | 2/1977 | Meyers et al. | 359/275 |
| 4,116,546 | 9/1978 | Leibowitz | 359/274 |
| 4,117,103 | 9/1978 | Hong | 423/593 |
| 4,193,670 | 3/1980 | Giglia et al. | 359/274 |
| 4,278,329 | 7/1981 | Matsuhiro et al. | 359/275 |
| 4,303,748 | 12/1981 | Armand et al. | 429/192 |

(List continued on next page.)

FOREIGN PATENT DOCUMENTS

| | | |
|---|---|---|
| 0373020 | 6/1990 | European Pat. Off. |
| 59-102216 | 6/1984 | Japan |
| 60-28630 | 2/1985 | Japan |
| 277927 | 12/1986 | Japan |
| 89-10578 | 11/1989 | World Int. Prop. O. |

OTHER PUBLICATIONS

Rauh et al, "Materials for Electrochromic Windows", SPIE, Optical Materials Technology . . . , vol. 502, 1984, pp. 38-45.

(List continued on next page.)

*Primary Examiner*—William Mintel
*Assistant Examiner*—Mahshid Saadat
*Attorney, Agent, or Firm*—Finnegan, Henderson, Farabow, Garrett & Dunner

[57] ABSTRACT

An electrochromic element useful in an electrochromic glass or mirror device and a process for making such element. The element is a five-layered structure including an electrolyte ion conducting layer interposed between first and second inorganic electrochromic layers which are interposed between a pair of conductive electrodes. The first and second inorganic electrochromic layers are different and are capable of exhibiting color-forming properties complementary to one another upon the incorporation of an alkali metal or Ag ion, a mixture of alkali metal or Ag ions or a mixture of alkali metal or Ag and hydrogen ions. The electrolyte ion conducting layer may be a copolymer of ethylene oxide, butylene oxide or methyl glycidyl ether, and optionally a small amount of allyl glycidyl ether, along with an ionizable salt, or may be a polyurethane gel formed by reacting the copolymer with triisocyanate, along with an ionizable salt. The second inorganic electrochromic layer comprises a transition metal oxide which exhibits a color change when shifting between the +2 and +3 valence states. The second inorganic electrochromic layer may be produced by an electrochemical process, a chemical process, or by a physical process. The electrochromic element may also comprise a plurality of five-layer structures in tandem, each pair separated by a substrate.

17 Claims, 1 Drawing Sheet

U.S. PATENT DOCUMENTS

| | | | |
|---|---|---|---|
| 4,312,929 | 1/1982 | Randin | 429/188 |
| 4,338,000 | 7/1982 | Kamimori et al. | 198/402 |
| 4,357,401 | 11/1982 | Andre et al. | 429/192 |
| 4,435,048 | 3/1984 | Kamimori et al. | 359/275 |
| 4,448,493 | 5/1984 | Matsudaira et al. | 359/268 |
| 4,449,790 | 5/1984 | Thoni | 359/274 |
| 4,464,447 | 8/1984 | Lazzari et al. | 429/194 |
| 4,471,037 | 9/1984 | Bannister | 429/191 |
| 4,497,726 | 2/1985 | Brule et al. | 252/182.1 |
| 4,498,739 | 2/1985 | Itaya et al. | 359/273 |
| 4,505,997 | 3/1985 | Armand et al. | 429/192 |
| 4,573,768 | 3/1986 | Polak et al. | 359/270 |
| 4,578,326 | 3/1986 | Armand et al. | 429/192 |
| 4,585,312 | 4/1986 | Ishiwata et al. | 359/268 |
| 4,620,944 | 11/1986 | Armand et al. | 252/518 |
| 4,638,407 | 1/1987 | Lundsgaard | 361/433 |
| 4,654,279 | 3/1987 | Bauer et al. | 429/192 |
| 4,664,934 | 5/1987 | Ito et al. | 427/38 |
| 4,671,619 | 6/1987 | Kamimori et al. | 359/275 |
| 4,690,840 | 9/1987 | Gauthier et al. | 427/436 |
| 4,712,879 | 12/1987 | Lynam et al. | 359/275 |
| 4,722,877 | 2/1988 | Sammells | 429/218 |
| 4,749,260 | 6/1988 | Yang et al. | 359/275 |
| 4,750,816 | 6/1988 | Ito et al. | 359/268 |
| 4,750,817 | 6/1988 | Sammells | 359/270 |
| 4,752,544 | 6/1988 | Gregory | 429/192 |
| 4,758,483 | 7/1988 | Armand et al. | 429/192 |
| 4,798,773 | 1/1989 | Yasukawa et al. | 429/192 |
| 4,801,195 | 1/1989 | Kawai et al. | 359/275 |
| 4,807,977 | 2/1989 | Sammells | 359/270 |
| 4,828,369 | 5/1989 | Hotomi | 359/270 |
| 4,851,307 | 7/1989 | Armand et al. | 429/192 |
| 4,867,541 | 9/1989 | Hotomi | 359/265 |
| 4,878,743 | 11/1989 | Aikawa et al. | 359/271 |
| 4,882,243 | 11/1989 | Skotheim et al. | 429/192 |
| 4,908,283 | 3/1990 | Takahashi et al. | 429/192 |
| 4,911,995 | 3/1990 | Belanger et al. | 429/192 |
| 4,938,571 | 7/1990 | Cogan et al. | 359/275 |
| 5,098,589 | 3/1992 | Motogami et al. | 429/192 |

OTHER PUBLICATIONS

"Polymer Conducts Protons at Room Temperature," C&En., Nov. 25, 1985, pp. 28–29.

Tada et al., "Electrochromic Windows Using a Solid Polymer Electrolyte", Solar Energy Materials, vol. 16, 1987, pp. 509–516.

Goldner et al., "Electrochromic Materials for Controlled Radiant Energy Transfer in Buildings", SPIE vol. 428 (Opt. Mater. Process Technol. Energy Effic. Sol. Appln.), pp. 38–44 (1983).

Svensson et al., "No Visible Electrochromism in High-Quality E-Beam Evaporated $In_2O_3$:Sn Films," Applied Optics vol. 24 No. 15, 1 Aug. 1985, pp. 2284–2285.

Cogan et al., "Materials and Devices in Electrochromic Window Development," SPIE vol. 562 (Opt. Mater. Technol. Energy Effic. Sol. Energy Convers. 4), pp. 23–31 (1985).

Lampert, "Electrochromic Materials and Devices for Energy Efficient Windows," Solar Energy Materials 11 (1984), pp. 1–27.

Schuster et al., "Solid State Electrochromic Infrared Switchable Windows," Solar Energy Materials 13 (1986), pp. 153–160.

Svensson et al., "Electrochromism of Nickel-Based Sputtered Coatings," Solar Energy Materials 16 (1987), pp. 19–26.

Babulanam et al., "Smart Window Coatings: Some Recent Advances," SPEI vol. 823 (Optical Material Technology for Energy Efficiency and Solar Energy Conversion VI), pp. 64–71 (1987).

Cogan et al., "Optical Switching in 'Complementary' Electrochromic Windows," SPIE vol. 692 (Material and Optics for Solar Energy Conversion), pp. 32–38 (1986).

Yu et al., "In-Situ Spectroscopic Studies of Electrochromic Hydrated Nickel Oxide Films," SPIE vol. 823 (Optical Materials Technology for Energy Efficiency and Solar Energy Conversion VI), pp. 113–123 (1987).

Fantini et al., "Electrochromic Nickel Hydroxide Films on Transparent Conducting Substrates," Solar Energy Materials 16 (1987), pp. 487–500.

Stefan et al., "Optical Properties of Electrochromic Hydrated Nickel Oxide Coatings Made by rf Sputtering," Applied Optics vol. 26, No. 8, 15 Apr. 1987, pp. 1554–1556.

Emrich et al., "Surface Analysis of Electrochromic Displays of Iron Hexacyanoferrate Films by X-Ray Photoelectron Spectroscopy," J. Vac. Sci. Technol. A5 (4) Jul/Aug. 1987, pp. 1307–1310.

Tada et al., "Ion Conductivity of Poly(ethylene oxide)-based Polyurethane Networks Containing Alkali Metal Salts," Jour. of Polymer Science Part A: Polymer Chemistry, vol. 25, pp. 3015–3024 1987.

Bonino et al., "Rilevatori Termoelettrocromici A Stato Solido", La Chimica E L'Industria, v. 69, N. 7/8 Juglio/Agosto 1987.

Scrosati, "Electrochromism And Electrochromic Devices", Chimicaoggi, Jun. 1989.

Passerini et al., "An Electrochromic Window Based on $Li_xWO_3/ (PEO)_8LiClO_4/NiO$", J. Electrochem. Soc. vol. 136, No. 11, Nov. 1989.

ELECTROCHROMIC ELEMENT, MATERIALS FOR USE IN SUCH ELEMENT, PROCESSES FOR MAKING SUCH ELEMENT AND SUCH MATERIALS AND USE OF SUCH ELEMENT IN AN ELECTROCHROMIC GLASS DEVICE

This is a division of application Ser. No. 07/379,225, filed Jul. 13, 1989, now U.S. Pat. No. 5,086,351.

BACKGROUND OF THE INVENTION

The present invention relates to electrochromic elements, and more particularly to laminated electrochromic glass devices and processes for making such devices.

Electrochromic materials generally are materials which change color upon application of electrical current to induce an electrochemical reaction in the material.

Electrochromic devices are known which comprise a laminated structure including an electrolyte ion conducting layer sandwiched between an electrochromic layer and a counter electrode layer, all sandwiched between a pair of conductive electrodes composed of, for example, indium-tin oxide.

Many of the prior art electrochromic elements utilize $WO_3$ as the electrochromic color-forming layer. It is known that $WO_3$ changes from a clear, transparent state to a colored state upon undergoing the reaction:

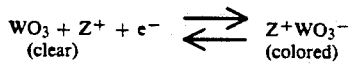

$$WO_3 + Z^+ + e^- \rightleftarrows Z^+WO_3^-$$
(clear) (colored)

wherein Z is selected from H or alkali metals such as Li or Na.

It is also known from the nonaqueous secondary battery art that various other metals will display electrochromic properties when changing from one valence state to another. Specifically, it is known that some transition metals exhibit electrochromic properties when moving between the +2 and +3 valence states and other transition metals exhibit such properties when changing between the +3 and +4 valence states.

Heretofore, the art has had difficulty utilizing the electrochromic properties of $WO_3$ in combination with the electrochromic properties of these other known transition metal oxides. For example, it is disclosed by U.S. Pat. No. 4,750,816 that "oxidatively color-forming materials suitable as opposing electrodes of reductive color-forming layers comprising $WO_3$, etc. are not found in inorganic materials." Column 1, lines 42–45). This is due to several factors, such as the difficulty in discovering oxidative color-forming materials which (1) have a high enough ion exchange capacity; (2) exhibit an adequate transparency or, even better, exhibit color changes complementary to those of $WO_3$; and (3) have a range of working potential compatible with that of the other materials in the electrochromic element.

The term "complementary" color changes, as used herein, means exhibiting opposite color-forming tendencies upon the insertion of an ion. $WO_3$ colors when an ion is inserted therein and thus materials "complementary" to $WO_3$ would bleach upon ion insertion. Thus, an electrochromic element utilizing a layer of $WO_3$ along with a layer of a material having a complementary color change to $WO_3$ would have two bleached electrochromic layers when an ion was inserted into the complementary layer and two colored layers when an ion was inserted into the $WO_3$ layer. This would enable an additive color effect to be attained.

Because of the aforementioned difficulties, prior art electrochromic devices tended to utilize either a single electrochromic layer of $WO_3$ or other electrochromic material to produce the desired electrochromic color change effect, or utilized either an inorganic compound which undergoes little or no color change upon ion insertion and removal or an organic compound as the opposing or counter electrode to the $WO_3$ layer. The use of a single electrochromic layer of $WO_3$ or a layer of $WO_3$ in conjunction with a counter electrode which remains transparent upon ion insertion and removal, suffers from the disadvantage that the difference in the amount of light that is transmitted through the layer in the clear and colored states is limited by the extent of color change of the $WO_3$ material. In addition, electrochromic devices utilizing an organic electrochromic layer suffer from the disadvantage that these layers are unstable over long periods of time and thus their long term color-forming durability is questionable.

It is an object of the present invention to provide a novel electrochromic element.

It is another object of the present invention to provide a novel electrochromic glass device.

It is another object of the present invention to provide an electrochromic element which is characterized by having a large difference between the percentage of visible light transmitted by the element in the colored state and the percentage of visible light transmitted by the element in the bleached state.

It is another object of the present invention to provide an electrochromic element which is characterized by having a large difference between the percentage of radiant heat transmitted by the element in the colored state and the percentage of radiant heat transmitted by the element in the bleached state.

It is another object of the present invention to provide an electrochromic element whose color-forming properties exhibit excellent long term durability.

It is another object of the present invention to provide an electrochromic element characterized by having an excellent response time, i.e., the period of time to change between the bleached state and the colored state is low.

It is another object of the invention to provide an electrochromic element that can operate effectively over a wide range of temperatures.

It is a further object of the invention to provide an electrochromic element that does not utilize toxic or corrosive materials.

Additional objects and advantages of the invention will be set forth in part in the description which follows, and in part will be obvious from the description, or may be learned by practice of the invention.

SUMMARY OF THE INVENTION

As embodied and broadly described herein, the electrochromic element of the present invention can be a five-layered structure which comprises a pair of electrodes at least one of which is transparent, first and second inorganic electrochromic layers interposed between the pair of electrodes and an ion conducting layer of an electrolyte interposed between the first and second inorganic electrochromic layers. The first and second inorganic electrochromic layers are preferably composed of different materials each of which is capable of exhibiting electrochromic properties upon the incorporation of an alkali metal or Ag ion. In addition, the electrochromic properties of the first and second inorganic electrochromic layers are preferably complementary to one another.

The electrochromic element of the invention, as embodied and broadly described herein, more particularly has a first inorganic electrochromic layer which is preferably $WO_3$ and a second inorganic electrochromic layer preferably comprising a transition metal oxide which exhibits a color change when shifting between the $+2$ and $+3$ valence states.

In another aspect of the invention, as embodied and broadly described herein, an electrochromic material is provided which may be utilized as the second inorganic electrochromic layer in the electrochromic element of the invention. This material comprises a transition metal oxide which exhibits a color change when shifting between the $+2$ and $+3$ valence states and can be represented by the formula $M_{x+y}T^{II}_{1-2x+y}T^{III}_{x-y}O$. M is selected from an alkali metal or Ag, an alkali metal or Ag and hydrogen, and a mixture of alkali or Ag metals. $T^{II}$ and $T^{III}$ are divalent and trivalent forms of a transition metal T. x is the mole fraction of $M^+$ ions that are incorporated into the electrochromic material in a first stage, y is the mole fraction of $M^+$ ions that are incorporated into the electrochromic material in a second stage, $0 < x \leq 1.0$, $-x \leq y \leq +x$, $y \geq 2x-1$ and the electrochromic material undergoes a maximum transmissivity change when y varies between $-x$ and $+x$.

The electrochromic element of the invention utilizing the above electrochromic material as the second inorganic electrochromic layer is capable of exhibiting a first color state when $y = x$ wherein the first inorganic electrochromic layer is bleached and has the composition $WO_3$ and the second inorganic electrochromic layer is bleached and has the composition $M_{2x}T^{II}_{1-x}O$, and a second color state when $y < x$ wherein the first inorganic electrochromic layer is colored and has the composition $MWO_3$ and the second inorganic electrochromic layer is colored and has the composition $M_{x+y}T^{II}_{1-2x+y}T^{III}_{x-y}O$. The first color state has a maximum transmissivity and the second color state has a less than maximum transmissivity. The minimum transmissivity would be attained when $y = -x$.

In another aspect of the invention, as embodied and broadly described herein, an electrochromic element is provided which comprises a plurality of five-layered electrochromic elements as described above, positioned in juxtaposed surface to surface relation with one another, each pair of five-layered elements separated by a substrate layer. More specifically, a device comprising a pair of five-layered elements comprises the following layers, in order: a first transparent substrate; a first transparent conductive electrode; a first inorganic electrochromic layer; a first ion conducting layer of an electrolyte; a first inorganic electrochromic counter electrode layer; a second transparent conductive electrode; a second transparent substrate; a third transparent conductive electrode; a second inorganic electrochromic counter electrode layer; a second ion conducting layer of an electrolyte; a second inorganic electrochromic layer; a fourth conductive electrode which may be transparent or reflective; and a third transparent substrate. The first and second inorganic electrochromic layers are preferably different from the first and second inorganic electrochromic counter electrode layers. The first and second inorganic electrochromic layers and the first and second inorganic electrochromic counter electrode layers are preferably capable of exhibiting electrochromic properties upon the incorporation of an alkali metal or Ag ion. In addition, the electrochromic properties of the first and second inorganic electrochromic layers preferably are complementary to the electrochromic properties of the first and second inorganic electrochromic counter electrode layers.

The invention also relates to processes for making the electrochromic material described above. As embodied and broadly described herein, one such process for producing an electrochromic material comprises:

a first step of forming an original thin film consisting essentially of TO, $T(OH)_2$ and TOOH by sputtering a target comprising T with $O_2/H_2$ plasma;

a second step of electrochemically processing the original thin film in alkali metal hydroxide solution to give a layer consisting essentially of TO and TOOH;

a third step of electrochemically processing the layer consisting essentially of TO and TOOH in a liquid electrolyte comprising a polar solvent selected from propylene carbonate and $(C_2H_5)_2NSO_2N(C_2H_5)_2$ and an ionizable salt MZ, wherein M is an alkali metal or Ag and Z is a strong acid anion selected from $ClO_4^-$, $CF_3SO_3^-$ and $N(CF_3SO_2)_2^-$, to incorporate $xM^+$ ions in a first stage and $yM^+$ ions in a second stage into the layer to form an electrochromic material having the composition $M_{x+y}T^{II}_{1-2x+y}T^{III}_{x-y}O$;

wherein T is a transition metal selected from Ni, Co, Mn and Fe; M is selected from an alkali metal or Ag, an alkali metal or Ag and hydrogen and a mixture of alkali or Ag metals; and $T^{II}$ and $T^{III}$ are divalent and trivalent forms of transition metal T.

Another process for producing an electrochromic material, as embodied and broadly described herein, comprises:

a first step of sputtering a target of $-M_aT_{1-a}O-$; wherein $0 < a \leq 1.0$, to form a thin film of $M_mT_n^{II}T_p^{III}O$;

a second step of electrochemically processing the thin film in a liquid electrolyte comprising a polar solvent selected from propylene carbonate and $(C_2H_5)_2NSO_2N(C_2H_5)_2$ and an ionizable salt MZ, wherein M is an alkali or Ag metal and Z is a strong acid anion selected from $ClO_4^-$, $CF_3SO_3^-$ and $N(CF_3SO_2)_2^-$, to incorporate $xM^+$ ions in a first stage and $yM^+$ ions in a second stage in the thin film to form an electrochromic material having the composition $M_{x+y}T^{II}_{1-2x+y}T^{III}_{x-y}O$;

wherein T is a transition metal selected from Ni, Co, Mn and Fe; $T^{II}$ and $T^{III}$ are divalent and trivalent forms of transition metal T; M is selected from an alkali metal or Ag, an alkali metal or Ag and hydrogen, and a mixture of alkali or Ag metals; and m, n and p are mole fractions.

The invention also relates to a method of manufacturing the electrochromic device as described above. This method, as embodied and broadly described herein, preferably comprises:

sputtering a layer of a conductive electrode material on a first substrate;

sputtering a layer of a first inorganic electrochromic material onto the conductive electrode layer on the first substrate;

sputtering a layer of a conductive electrode material on a second substrate;

sputtering a layer of a second inorganic electrochromic material onto the conductive electrode layer on the second substrate; and assembling an ion conducting layer of an electrolyte between the sputtered sides of the first and second substrates.

The invention further relates to a method of manufacturing the electrochromic device comprising a pair of five-layered electrochromic elements in back to back relation. Such a method, as embodied and broadly described herein, comprises:

sputtering a layer of a conductive electrode material on a first substrate;

sputtering a layer of a first inorganic electrochromic material onto the conductive electrode layer on the first substrate;

sputtering a layer of a conductive electrode material on a second substrate;

sputtering a layer of a first inorganic electrochromic material onto the conductive electrode layer on the second substrate;

sputtering a layer of a conductive electrode material on each side of a third substrate; and sputtering a layer of a second inorganic electrochromic material on the conductive electrode layer on each side of the third substrate. The sputtered side of the first substrate is assembled into juxtaposed contact with one side of the third substrate with an ion conducting layer of an electrolyte interposed therebetween. The sputtered side of the second substrate is then assembled into juxtaposed contact with the other side of the third substrate with an ion conducting layer of an electrolyte interposed therebetween.

The accompanying drawings, which are incorporated in and constitute a part of this specification, illustrate preferred embodiments of the invention and together with the detailed description of the preferred embodiments herein, serve to explain the principles of the invention.

DESCRIPTION OF THE PREFERRED EMBODIMENTS

Figure 1:
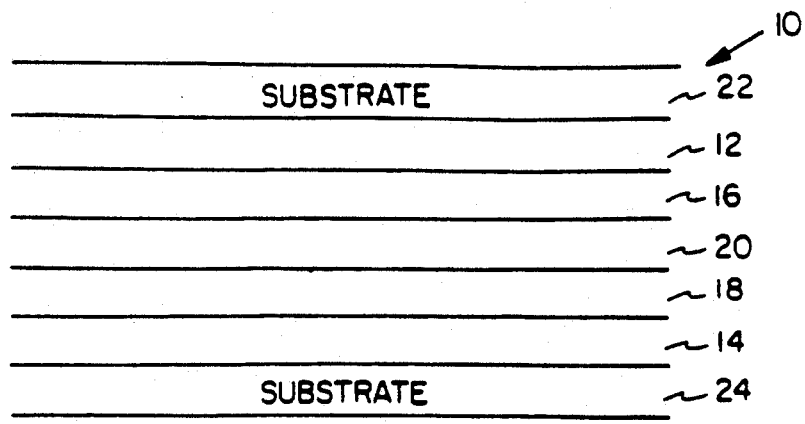
FIG. 1 is a sectional view showing a construction of one embodiment of the laminate electrochromic device of the present invention.

Reference will now be made in detail to the present preferred embodiments of the invention, examples of which are illustrated in the accompanying drawings.

In accordance with the present invention, there is provided an electrochromic element comprising a pair of electrodes at least one of which is transparent, first and second inorganic electrochromic layers interposed between the pair of conductive electrodes and an ion conducting layer of an electrolyte interposed between the first and second inorganic electrochromic layers, wherein the first and second inorganic electrochromic layers are different and are capable of exhibiting electrochromic properties upon the incorporation of an alkali metal or Ag ion and wherein the electrochromic properties of the first and second inorganic electrochromic layers are complementary. As embodied in FIG. 1, electrochromic element 10 comprises a pair of conductive electrodes 12 and 14. Conductive electrodes 12 and 14 may both be transparent or one may be transparent and the other reflective.

In a preferred embodiment of the invention, electrochromic element 10 is utilized in an electrochromic glass device. In such an embodiment, conductive electrodes 12 and 14 are both transparent and are formed on two substrates 22 and 24 made of, for example, glass or plastic. Conductive electrodes 12 and 14 may be any of those materials known in the art to be useful as transparent conductive electrodes and are preferably composed of indium tin oxide, which is a composition of $In_2O_3$ containing 5 wt. % of $SnO_2$, or fluorine doped tin oxide ($SnO_2$:F). When utilizing indium tin oxide as conductive electrodes 12 and 14, the indium tin oxide is preferably deposited on float glass. Pyrrolytic glass ($SnO_2$:F) as supplied by the glass industry may also be utilized, which would function as both conductive electrodes 12 and 14 and substrates 22 and 24.

In another embodiment of the invention, electrochromic element 10 is utilized in a mirror. In such an embodiment, one of conductive electrodes 12 and 14 is reflective and the other is transparent. The conductive electrode 12 or 14 that is reflective may be any of those materials known in the art to be useful as reflective conductive electrodes, such as Al, Au or Ag.

In accordance with the present invention as embodied in FIG. 1, first inorganic electrochromic layer 16 and second inorganic electrochromic layer 18 are interposed between conductive electrodes 12 and 14. First inorganic electrochromic layer 16 preferably comprises $WO_3$. $WO_3$ is bleached in its normal state and is thus transparent. However, the compound $WO_3$ has the property that it exhibits a colored state when $H^+$ ions, $Ag^+$ ions or alkali metal ions such as $Li^+$ are incorporated therein. First inorganic electrochromic layer 16 may alternatively comprise $CrO_2$, $FeO$ or $MoO_3$, or any of those compounds known in the art that are bleached in the normal state and colored when $H^+$, $Ag^+$ or alkali metal ions are incorporated therein.

In accordance with the invention, first inorganic electrochromic layer 16 may be produced by sputtering a tungsten target to form a film of $WO_3$ or alternatively, the film of $WO_3$ may be electrochemically processed.

In accordance with the invention, second inorganic electrochromic layer 18 preferably comprises a transition metal oxide having the property of exhibiting a color change when shifting between the +2 to +3 valence states. The composition of second inorganic electrochromic layer 18 can be represented by the formula $M_{x+y}T^{II}_{1-2x+y}T^{III}_{x-y}O$. $T^{II}$ and $T^{III}$ are divalent and trivalent forms of transition metal T, and M is selected from an alkali metal or Ag, an alkali metal or Ag and hydrogen, and a mixture of alkali or Ag metals. The transition metal T that can be utilized in second inorganic electrochromic layer 18 includes Ni, Co, Mn and Fe. The alkali metal utilized in second inorganic electrochromic layer 18 may be Li, Na, K or Cs and is preferably Li. x represents the mole fraction of $M^+$ ions that are incorporated into second inorganic electrochromic layer 18 in a first stage. y represents the mole fraction of $M^+$ ions that are incorporated into second inorganic electrochromic layer 18 in a second stage.

In accordance with the invention, alkali metal or Ag ions can be incorporated into first and second inorganic electrochromic layers 16 and 18 without the corresponding incorporation of $H^+$ ions. However, during assembly of electrochromic element 10, it is possible that some amount of water may enter the system. The presence of water in the electrochromic system may cause certain amounts of H+ ions to be formed which will inevitably become incorporated into first and second inorganic electrochromic layers 16 and 18 along with alkali metal or Ag ions. The presence of H+ ions in the system can cause problems in that WO3 degrades in the presence of H2O, which may be formed as a by-product. In addition, H2 gas may be formed as a by-product from H+ ions and can cause bubble formation (often called "outgassing"). On the other hand, H+ ions are smaller than alkali metal or Ag ions and thus are more mobile which results in faster incorporation and extraction from first and second inorganic electrochromic layers 16 and 18. A mixture of alkali metal or Ag ions and hydrogen ions incorporated into first and second inorganic electrochromic layers 16 and 18 will have some of the characteristics of both H+ incorporation and M+ incorporation.

In accordance with the invention, second inorganic electrochromic layer 18 may be produced by an electrochemical method of first sputtering a target comprised of a transition metal T with a plasma of $O_2/H_2$ to form an original thin film layer consisting essentially of a mixture of TO, T(OH)2 and TOOH. This original layer is then preferably electrochemically processed in an alkali metal hydroxide solution, for instance NaOH, 1N solution, wherein the original layer is the cathode and the anode is a platinum electrode. This electrochemical step yields a layer consisting essentially of TO and TOOH. The resulting layer is then electrochemically processed in a liquid electrolyte solution with one electrode consisting of the TO/TOOH mixture with an opposing lithium electrode. The liquid electrolyte may comprise a polar solvent selected from propylene carbonate and $(C_2H_5)_2NSO_2N(C_2H_5)_2$ and an ionizable salt MZ, wherein M is an alkali metal or Ag and Z is a strong acid anion selected from $ClO_4^-$, $CF_3SO_3^-$ and $N(CF_3SO_2)_2^-$. The electrochemical reaction that takes place causes a particular mole fraction of M+ ions, designated herein as x, to become incorporated into the layer in a first stage. This electrochemical reaction is designated by the following equation:

$$[(1-2x)TO, 2xTOOH] + xM^+ + xe^- \rightarrow [(1-2x)TO, xMTO_2, xHTOOH]$$

While not intending to be bound by any theory of how the invention works, it is believed that the H atoms in TOOH are loosely attached and may migrate into the interior of the layer. It is believed that a solid solution is spontaneously formed which comprises $M_xT^{II}_{1-2x}T^{III}_xO$.

In addition to the M+ ions that can be incorporated into the layer in a first stage, yM+ additional ions can be incorporated in a second stage by the following equation:

wherein y is the mole fraction of M+ ions that are incorporated into the layer in this second stage.

The present invention utilizes the property of transition metals such as Ni, Co, Mn and Fe that undergo a color change when moving between the +2 and +3 valence states. Generally, these transition metals are colored in the +3 valence state and bleached in the +2 valence state. It can be seen that if y = −x, representing the state of no incorporation, then the layer will consist of $M_xT^{II}_{1-3x}T^{III}_{2x}O$, which will be colored because of the presence of $T^{III}$. However, if $y = y_{max} = x$, which represents the ion incorporated state, then the layer will consist of $M_{2x}T^{II}_{1-x}O$. The layer will thus be bleached because of an absence of $T^{III}$.

A preferred result could be achieved if $x = y_{max} = 0.5$, wherein the equation representing reversible incorporation would be $M_{0.5}T_{0.5}{}^{III}O + (0.5)M^+ + (0.5)e^- \rightarrow MT_{0.5}{}^{II}O$. In this case, the reversible incorporation of M+ ions would cause the electrochromic layer to go from a compound having T entirely in the +3 transition state to a compound having T entirely in the +2 transition state, which would represent the maximum color change.

In accordance with the invention, an alternative method for producing second inorganic electrochromic layer 18 is a physical preparation which comprises a first step of sputtering a target of $M_\alpha T_{1-\alpha}O$, wherein $0 < x \leq 1.0$ and $\alpha$ represents mole fraction, to form a thin film of $M_m T_n{}^{II} T_p{}^{III}O$, wherein m, n and p represent mole fractions of M, $T^{II}$ and $T^{III}$, respectively; and a second step of electrochemically processing the thin film in a liquid electrolyte comprising a polar solvent selected from propylene carbonate and $(C_2H_5)_2NSO_2N(C_2H_5)_2$ and an ionizable salt MZ, wherein M is an alkali metal or Ag and Z is a strong acid anion selected from $ClO_4^-$, $CF_3SO_3^-$ and $N(CF_3SO_2)_2^-$, to incorporate xM+ ions in a first stage and incorporate yM+ ions in a second stage into the thin film to form the electrochromic material having the composition $M_{x+y}T^{II}_{1-2x+y}T^{III}_{x-y}O$.

In accordance with the invention, an alternative method for producing either first or second inorganic electrochromic layers 16 or 18 is a method that consists of chemically inserting alkali metal atoms such as lithium or silver atoms into either layer. This method overcomes the potential problem of H+ contamination since protons are incapable of co-existing with alkali metal or Ag in these solutions.

In accordance with the present invention as embodied in FIG. 1, ion conducting layer 20 is interposed between first and second inorganic electrochromic layers 16 and 18. Ion conducting layer 20 preferably consists of a solid polymeric electrolyte, which is an amorphous solid solution comprising a copolymer of ethylene oxide and methyl glycidyl ether and at least one ionizable salt. Alternatively, the copolymer may be ethylene oxide and butylene oxide. The preferred proportions of the copolymer are 75% ethylene oxide and 25% methyl glycidyl ether or butylene oxide. In addition, a small amount of allyl glycidyl ether (5%) may be included in the copolymer. The molecular weight of the copolymer preferably ranges between 30,000 and 2,000,000. The ionizable salt utilized in conjunction with the solid copolymer, can be a mixture of $MClO_4$ and $MN(CF_3SO_2)_2$ or can consist entirely of $MN(CF_3SO_2)_2$, wherein M is an alkali metal or Ag, preferably Li. The solid polymeric electrolyte may also include a plasticizer such as $(C_2H_5)_2NSO_2N(C_2H_5)_2$.

In accordance with an alternative embodiment of the invention, ion conducting layer 20 may comprise a polyurethane made by reacting triisocyanates with the above-mentioned copolymers having a low molecular weight (1,000–20,000) along with at least one of the above-mentioned ionizable salts. Such a polyurethane network utilized in ion conducting layer 20 chemically crosslinks and hardens at room temperature.

The basic chemical reaction is:

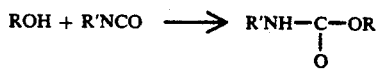

These polyurethane networks have the advantage of nearly perfect optical transparency.

In accordance with the invention, the ion conducting layer 20 may also utilize a liquid electrolyte such as $LiClO_4$-propylene carbonate. However, a solid polymeric electrolyte for use in ion conducting layer 20 is preferable over liquid electrolytes because the solid polymers are much easier to handle in assembling the electrochromic device and present far fewer safety concerns in the assembled device from potential leaking. One important factor which can cause "haze" problems in electrochromic elements is the crystallization of the ion conducting layer. The solid polymeric electrolyte of the invention comprising a copolymer of ethylene oxide and methyl glycidyl ether or butylene oxide along with at least one ionizable salt and the solid polymeric electrolyte comprising a polyurethane gel and at least one ionizable salt each provides an efficient layer for conducting ions between first and second inorganic electrochromic layers 16 and 18 without significant crystallization of the solid polymer electrolyte, i.e., the solid polymer electrolyte remains amorphous. In addition, the copolymer including butylene oxide has the advantage of being less hydrophilic.

The ion conducting macromolecular material of the present invention can broadly be any polymer-based material exhibiting an ionic conductivity at least equal to $10^{-7}$ siemens/cm at room temperature and an electronic conductivity lower than $10^{-10}$ siemens/cm.

In particular, the ion conducting macromolecular material can comprise a solid solution of at least one ionizable salt, especially an alkali metal or Ag salt and more particularly a lithium salt, in a plastic polymeric material comprising at least in part one or more polymers and/or copolymers of monomers containing at least one heteroatom, especially oxygen or nitrogen, able to form donor/acceptor bonds with the cation of the ionizable salt, the polymers being in particular, chosen among polyethers, and more especially among the homopolymers of ethylene oxide or propylene oxide (see European Patent Application No. 0013199). The plastic polymeric material can comprise a copolymer of ethylene oxide and of another cyclic oxide, said copolymer having either the structure of a statistical copolymer (U.S. Pat. No. 4,578,326) which may be crosslinked (French Patent No. 2,570,224) or the form of a polyurethane network resulting from the reaction of a sequenced copolymer of ethylene oxide and another cyclic oxide with a coupling agent consisting of an organic polyisocyanate (French Patent No. 2,485,274). Moreover, the ionizable salts mentioned in European Patent Application No. 0013199 can be replaced in whole or in part by ionizable salts such as alkali metal closoboranes (French Patent No. 2,523,770), alkali metal tetrakistrialkylsiloxyalanates (French Patent No. 2,527,611), alkali metal bis(perhalogenoalkylsulfonyl)imidides or bis(perhalogenoacyl)imidides (French Patent No. 2,527,602), alkali metal tetraalkynylborates or aluminates (French Patent No. 2,527,610), alkali metal derivatives of perhalogenoalkylsulfonylmethane or perhalogenoacetylmethane (French Patent No. 2,606,218), or alkali metal salts of polyethoxylated anions (European Patent Application No. 0,213,985).

The ion conducting macromolecular material of the invention can also broadly consist of a solid solution of an ionizable salt, for example one of those mentioned above, in a polymeric material made up with an organometallic polymer in which at least two polyether chains are linked by a metallic atom selected from Al, Zn and Mg (French Patent No. 2,557,735) or among Si, Cd, B and Ti (French Patent No. 2,565,413), or in a polymeric material consisting of a polyphosphazene bearing on each phosphorus atom two polyether groups such as polyethylene oxide groups. The ion conducting macromolecular material may also be selected from the mixtures of polymers having a solvating and/or polar character with any salt, acid or base sufficiently dissociated in the polymer to obtain the appropriate conductivity, from polymers bearing ionizable functions resulting in anions or cations attached to the macromolecular chains, from protonic conductors such as those described in French Patent No. 2,593,328 or mixtures of inert polymers with mineral or organic ion conducting materials dispersed in the polymer matrix.

In a preferred embodiment of the present invention, electrochromic element 10 is interposed between a pair of glass or plastic substrates 22 and 24. Such an arrangement forms an electrochromic device. The electrochromic device can be manufactured by sputtering on a glass o plastic substrate 22 or 24, conductive electrode 12 which may be composed of indium-tin oxide or fluorine doped tin oxide ($SnO_2$:F). First inorganic electrochromic layer 16 is then sputtered onto conductive electrode 12. On a second glass or plastic substrate 22 or 24, conductive electrode 14 is sputtered, and second inorganic electrochromic layer 18 is sputtered onto conductive electrode 14. The two sputtered glass substrates are then assembled with ion conducting layer 20, which may be a solid polymeric electrolyte, interposed therebetween.

In accordance with the invention, it should also be possible to manufacture electrochromic element 10 by depositing all of the active layers, i.e., conductive electrodes 12 and 14, first and second inorganic electrochromic layers 16 and 18 and ion conducting layer 20 in the form of a gel. (See Solid State Ionics 28-30 (1988)-1722).

In accordance with the invention, $M^+$ ions can be incorporated into first inorganic electrochromic layer 16 prior to being assembled in the electrochromic element 10. Alternatively, $M^+$ ions can be incorporated into second inorganic electrochromic layer 18 prior to assembly into the electrochromic device. In either case, the application of a voltage differential between conductive electrodes 12 and 14 will cause the $M^+$ ion to move out of one inorganic electrochromic layer 16 or 18, through ion conducting layer 20 and into the other inorganic electrochromic layer 16 or 18, thereby causing each of first and second inorganic electrochromic layers 16 and 18 to become either bleached or colored.

In accordance with the invention, the voltage differential between conductive electrodes 12 and 14 sufficient to cause $M^+$ ions to be incorporated into either first or second inorganic electrochromic layers 16 and 18 is less than or equal to 3.5 volts vs. Li. This makes first and second inorganic electrochromic layers 16 and 18 compatible with ion conducting layer 20 when utilizing a solid polymeric electrolyte containing a lithium salt which will decompose at potentials greater than or equal to 3.5 volts vs. Li.

Figure 2:
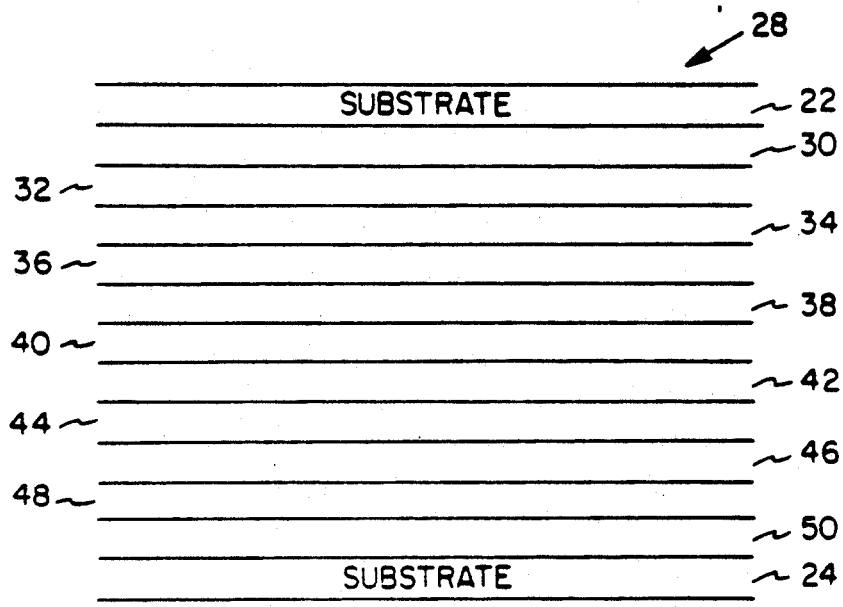
FIG. 2 is a sectional view showing a construction of a second embodiment of the laminate electrochromic device of the invention.

In an alternative embodiment of the invention, as embodied in FIG. 2, electrochromic element 28 comprises:

a first transparent conductive electrode 30 which may be indium tin oxide or fluorine doped tin oxide;

first inorganic electrochromic layer 32 which may be $WO_3$, $MoO_3$ or $CrO_2$;

first ion conducting layer of an electrolyte 34 which may be a solid polymeric electrolyte comprising a terpolymer of ethylene oxide, butylene oxide and allyl glycidyl ether and at least one ionizable salt or may be a solid polymeric electrolyte comprising a polyurethane gel and at least one ionizable salt;

first inorganic electrochromic counter-electrode layer 36 which may be the same transition metal oxides as disclosed earlier for second inorganic electrochromic layer 18 of FIG. 1;

second transparent conductive electrode 38 which may be indium tin oxide or fluorine doped tin oxide;

transparent substrate 40 which may be glass or a plastic;

third transparent conductive electrode 42 which may be indium tin oxide or fluorine doped tin oxide;

second inorganic electrochromic counter-electrode layer 44 which may be the same transition metal oxides as disclosed earlier for second inorganic electrochromic layer 18 of FIG. 1;

second ion conducting layer of an electrolyte 46 which may be the same materials as for layer 34;

second inorganic electrochromic layer 48 which may be $WO_3$, $MoO_3$ or $CrO_2$;

and fourth conductive electrode 50 which may be transparent or reflective.

First and second inorganic electrochromic layers 32 and 48 are preferably different from first and second inorganic electrochromic counter-electrode layers 36 and 44. First and second inorganic electrochromic layers 32 and 48 and first and second inorganic electro-chromic counter-electrode layers 36 and 44 are preferably capable of exhibiting electrochromic properties upon the incorporation of an alkali metal or Ag ion. The electrochromic properties of first and second inorganic electrochromic layers 32 and 48 are preferably complementary to the electrochromic properties of first and second inorganic electrochromic counter-electrode layers 36 and 44. Within the scope of the present invention, electrochromic element 28 may be interposed between two layers of transparent substrate materials 22 and 24, such as glass or plastic.

In accordance with the invention, electrochromic element 28 can be manufactured by sputtering a layer of a conductive electrode material on a first transparent substrate 22 or 24 to form first transparent conductive electrode 30 followed by sputtering a layer of a first inorganic electrochromic material onto first transparent conductive electrode 30 to form first inorganic electrochromic layer 32. Similarly, fourth conductive electrode 50 and second inorganic electrochromic layer 48 can be formed on a second glass substrate 22 or 24. A third glass substrate 40 can be sputtered with second transparent conductive electrode 38 and first inorganic electrochromic counter-electrode layer 36 on one side and sputtered with third transparent conductive electrode 42 and second inorganic electrochromic counter-electrode layer 44 on the other side. First ion conducting layer of an electrolyte 34 can be assembled between the sputtered side of first glass substrate 22 or 24 and either side of third glass substrate 40. Second ion conducting layer of an electrolyte 46 can then be assembled between the sputtered side of second glass substrate 22 or 24 and the other side of third glass substrate 40 to form electrochromic element 28.

The electrochromic element of the present invention utilizing Ni as the transition metal in second inorganic electrochromic layer 18 and Li ions as the insertion ions has achieved an ion exchange of 5-6 $mC/cm^2$. At ion exchanges greater than 5-6$mC/cm^2$, durability of the element begins to decline. It is believed that this decline in durability is caused by irreversible damage at the conductive electrode/counter-electrode interface. The electrochromic element of the present invention has been shown to be durable over more than 4,500 cycles in severe conditions while achieving complete bleaching and coloration at each cycle. Changes in transmissivity of the electrochromic element of the invention have been achieved ranging from 30-35% to approximately 85% of visible transmitted light when utilizing the element of FIG. 1 and also lower ranges have been achieved ranging from 3-5% to 55-60% of visible transmitted light when utilizing the element of FIG. 2. The switching time of the electrochromic element of the invention, i.e., the time to go from the colored state to the bleached state is in the range of 5-10 minutes.

The following Examples are provided to illustrate the present invention and some of its advantages. The Examples are not intended to limit the invention.

EXAMPLE 1

Manufacture of a Solid State Device

Manufacture of Transparent Conductive Electrodes (TE)

Transparent conductive electrodes consisting of ITO (Indium Tin Oxide), deposited by reactive DC sputtering from an indium tin target, were deposited on float glass (5×5 $cm^2$) under the following conditions:

| | |
|---|---|
| Initial pressure: | $10^{-5}$ mb |
| Oxygen pressure: | $10^{-3}$ mb |
| Argon pressure: | 2.2 $10^{-3}$ mb |
| Total pressure: | 3.2 $10^{-3}$ mb |
| Power: | 400 W |
| Voltage: | 515 V |
| Sputtering time: | 10 min. |
| Annealing: | 450° C. for 30 min. |
| Properties of the films: | |
| thickness = 1600 A | |
| sheet resistance $R_O$ = 50 ohms | |
| optical transmission at 550 nm: 90% | |
| Preparation of First Inorganic Electrochromic Layer $EC_1$ | |

$WO_3$ was prepared by reactive DC sputtering from a tungsten target under the following conditions:

| | |
|---|---|
| Initial pressure: | $10^{-5}$ mb |
| Oxygen pressure: | 8 × $10^{-3}$ mb |
| Power: | 1000 W |
| Voltage: | 490 V |
| Sputtering time: | 50 min. |

The $WO_3$ films thereby obtained can be either directly used or electrochemically processed ("formated") in $H_2SO_4$, 1N solution prior to utilization. A three electrode cell configuration was used for this processing: the electrochromic material $EC_1$, a platinum counter electrode and a saturated calomel reference electrode (SCE). The electrochemical treatment consisted first of a cathodic polarization of $EC_1$ at 0.5 V vs. SCE for 120 seconds then followed by an anodic polarization at +0.5 V vs. SCE for 120 seconds. This cycle was repeated three times and the procedure was terminated with the anodic polarization. Finally, the films were rinsed in distilled water and then dried at room temperature.

The performances of both types of thin films (straight from sputtering and formated in $H_2SO_4$) are compared in the following table (transmission measurements were carried out at 550 nm).

|  | Thickness (A) | Exchanged charge (mC/cm2) | Transm. colored (%) | Transm. bleached (%) | Coloring time (min.) | Bleaching time (min.) |
|---|---|---|---|---|---|---|
| $WO_3$ (straight) | 3000 | 7 | 45 | 90 | 6 | 5 |
| $WO_3$ (formated) | 3000 | 10 | 35 | 90 | 4 | 3 |

Preparation of Second Inorganic Electrochromic Layer ($EC_2$)

Two methods have been used: electrochemcial physical

Electrochemical preparation involved three steps

1st step

The "original" layer was prepared by reactive DC sputtering from a nickel target under the following conditions:

| Initial pressure: | $10^{-5}$ mb | Power: | 300 W |
|---|---|---|---|
| Oxygen pressure: | $7.2 \times 10^{-3}$ mb | Voltage | 240 V |
| Hydrogen pressure: | $0.4 \times 10^{-3}$ mb | Sputtering time: | 60 min. |
| Total pressure: | $7.6 \times 10^{-3}$ mb | Film thickness: | 1100 A |

This produced a thin film consisting of a mixture of NiO, $Ni(OH)_2$ and NiOOH.

2nd step

After sputtering, the film was electrochemically processed in NaOH, 1N, in a manner similar to that described above for $WO_3$, but with an anodic polarization vs SCE for 2 min.

This yielded the formation of a layer of NiOOH and NiO. Once formated, the film was rinsed in distilled water, then dried at room temperature.

3rd step

The final active material, namely $Li_{x+y}Ni^{II}_{1-2x+y}Ni^{III}_{x-y}O$, was obtained after an electrochemical treatment performed in a dry box. The procedure utilized a two-electrode cell configuration, namely the Ni based film and a lithium electrode; both electrodes were immersed in $LiClO_4$(1M)propylene carbonate ($LiClO_4$ p.c.). The film was then polarized at 1.7 V vs Li for 60 min. to produce the above mentioned active material $Li_{x+y}Ni^{II}_{1-2x+y}Ni^{III}_{x-y}O$.

Physical preparation

Steps 1 and 2 above were replaced by reactive direct sputtering (RF) from a $Li_{0.3}Ni_{0.7}O$ target having a 75 mm diameter.

Target manufacturing

A mixture (powder) of 0.15 $Li_2CO_3$ + 0.7 NiO (molar proportion) was first heated in air at 1000° C. for 8 hours, and then compacted at 50 tons for 10 mins. The material thereby obtained was finally sintered in air at 1000° C. for 8 hours. The conditions for the reactive RF sputtering were the following:

| Initial pressure: | $10^{-5}$ mb | Voltage: | 200 V |
|---|---|---|---|
| Oxygen pressure: | $2.5 \times 10^{-2}$ mb | Sputtering time: | 120 mn |

| Powder: | 30 W | Film thickness: | 1100 A |
|---|---|---|---|

The thin film obtained by sputtering was then processed in $LiClO_4$ p.c. as the third step of the electrochemical method described above to produce the final $Li_{x+y}Ni_{1-x}O$ material.

The performance of both types of Ni based thin films are compared in the following table (light transmission is measured at 550 nm).

|  | Thickness (A) | Exchanged charge (mC/cm2) | Transm. colored (%) | Transm. bleached (%) | Coloring time (mn) | Bleaching time (mn) |
|---|---|---|---|---|---|---|
| Electro chemical preparation | 1100 | 6 | 45 | 90 | 30 | 20 |
| Physical preparation | 1100 | 12 | 20 | 75 | 3 | 2 |

Preparation of the Solid Polymer Electroyle (SPE)

The solid polymer electrolyte was a "solid solution" of a lithium salt in a copolyether type polymer. The polymer was an ethylene oxide based terpolymer comprised of:

75% (Wt %) ethylene oxide (OE):
$(CH_2-CH_2-O)_n$

20% (Wt %) methyl glycidyl ether (MGE):
$(CH_2-CH-O)_n$
   |
   $CH_2-O-CH_3$

5% (Wt %) allyl glycidyl ether (AGE):
$(CH_2-CH-O)_n$
   |
   $CH_2-O-CH_2-CH=CH_2$ An equimolar mixture of $LiClO_4$ and $LiN(CF_3SO_2)_2$ salt was dissolved in the polymer (15% wt.) to form the solid polymer electrolyte. The incorporation of the salt into the polymer was operated in air by means of a co-solvent like acetonitrile ($CH_3CN$).

The above solution (polymer+salt in $CH_3CN$) was spread (by a doctor-blade technique) onto the two electrodes (electrochromic films) at a thickness of 200 microns.

To remove the solvent and obtain a layer of solid polymer electrolyte on each substrate, they were dried at 70° C. under 12 bars pressure minimum (in air). Each SPE layer obtained was 20 microns thick.

Assembly of the Complete Device

The two parts (glass+TE+EC) were then assembled together with the SPE interposed between, in a vacuum press (0.5 mb). Prior to assembling, however, the parts were heated separately at 80° C. for 10 mins. and the air was removed out of the press chamber using a vacuum pump (0.5 mb). The parts were then pressed against each other at roughly 50 Kg/in² for 3 mins.

Finally, the device was sealed (in air) with a low vapor pressure resin in order to prevent the contamination by air and moisture.

Performance of the Complete Device

A device prepared containing the electrochemically prepared Ni based material $EC_2$ was evaluated over a number of cycles. $EC_1$ was straight $WO_3$ obtained by DC sputtering. The polymer-salt combination utilized as the ion conducting layer was the terpolymer described above.

The characteristics of the device were the following:
surface area: 20 cm²
working potential range ($WO_3$ vs Ni based $EC_2$): −1.6 V for coloring; +1.4 V for bleaching
charge ($Li^+$) exchanged: 5-6 mC/cm²
number of cycles: over 2000
maximum transmission changes at 550 nm: 33%→85%
times to achieve the transmission changes:

| Transmission %: | 85 | 35 | 78 | 40 | 73 | 45 |
|---|---|---|---|---|---|---|
| Time (min.): | 5 | 12 | 3 | 7 | 2 | 4 |
| % of total transmission change: | 100% | | 90% | | 80% | |

EXAMPLE 2

The preparation of this system was identical to that of Example 1 except that the solid polymer electrolyte was a polyurethane network made by reacting a triisocyanate with a low molecular weight (Mw=10,000) copolymer comprising 75% ethylene oxide and 25% methyl glycidyl ether. The characteristics of this device were:
maximum transmission changes at 550 nm: 35%→83%
number of cycles: over 3,000
times to achieve the transmission changes:

| Transmission %: | 83 | 35 | 76 | 38 |
|---|---|---|---|---|
| Time (min.): | 5 | 12 | 2 | 4 |
| % of total transmission change: | 100% | | 80% | |

EXAMPLE 3

The preparation of this system was identical to that of Example 1, except that the electrolyte was a liquid electrolyte made up with a solution of $LiClO_4$ (1M) in propylene carbonate and $EC_2$ was physically prepared. The two electrodes (Physical Ni based $EC_2$ and $WO_3$) were assembled against each other with a plastic spacer in between and the system was then filled up by the liquid electrolyte.

The characteristics of this device were:
surface area: 20 cm²
working potential range: −0.8 V for coloring; +1.9 V for bleaching
charge ($Li^+$) exchanged: 5 mC/cm²
number of cycles: over 250
maximum transmission changes: 10%→58%
times to achieve the transmission changes:

| Transmission %: | 58 | 10 | 46 | 12 |
|---|---|---|---|---|
| Time (min.): | 3.5 | 5 | 2.3 | 1.5 |
| % of total transmission change: | 100% | | 80% | |

EXAMPLE 4

The preparation of this system was identical to that of Example 1, except for the nature of the electrolyte.

In this Example, the Ni based $EC_2$ was an "electrochemically prepared $EC_2$." The solid polymer electrolyte was a "solid solution" of a lithium salt in a copolyether type polymer. The polymer was an ethylene oxide based terpolymer comprised of:

75% (Wt %) ethylene oxide (OE)
$(CH_2-CH_2-O)_n$

20% (Wt %) butylene oxide (BO)
$(CH_2-CH-O)_n$
        |
        $CH_2-CH_3$

5% (Wt %) allylglycidyl ether (AGE)
$(CH_2-CH-O)_n$
        |
        $CH_2-O-CH_2-CH=CH_2$ The lithium salt was $Li\ N(CF_3SO_2)_2$, incorporated in the polymer at 20% (wt.).

The characteristics of the devices were:
surface area: 20 cm²
working potential range: −1.6 V for coloring; +1.4 V for bleaching
charge ($Li^+$) exchanged: 5 mC/cm²
number of cycles: over 300
maximum transmission changes: 40%→80%
times to achieve the transmission changes:

| Transmission %: | 80 | 40 | 65 | 33 |
|---|---|---|---|---|
| Time (min.): | 5 | 10 | 2 | 4 |
| % of total transmission change: | 100% | | 80% | |

EXAMPLE 5

The preparation of this system was identical to that of Example 1 except for the transparent conductive electrodes, the Ni based $EC_2$ and the solid polymer electrolyte. In this Example, the Ni based $EC_2$ was an "electrochemically prepared $EC_2$." The transparent conductive electrodes were $SnO_2$:F (fluorine doped tin oxide) prepared by chemical vapor deposition. The solid polymer electrolyte was a "solid solution" of a lithium salt in a copolyether type polymer. The polymer was an ethylene oxide based copolymer comprised of:

75% (Wt %) ethylene oxide (OE)
$(CH_2-CH_2-O)_n$

-continued

25% (Wt %) butylene oxide (BO)

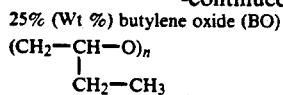

An equimolar mixture of LiClO$_4$ and LiN(CF$_3$SO$_2$)$_2$ salt was dissolved in the polymer (15% wt.) to form the solid polymer electrolyte.

The characteristics of the device were:
surface area: 20 cm$^2$
working potential range: $-1.6$ V for coloring; $+1.4$ V for bleaching
charge (Li$^+$) exchanged: 5–6 mC/cm$^2$
number of cycles: over 300
maximum transmission changes: 37%→83%
times to achieve the transmission changes:

| Transmission %: | 83 | 37 | 78 | 41 |
|---|---|---|---|---|
| Time (min.): | 5 | 11 | 2 | 4 |
| % of total transmission change: | 100% | | 80% | |

The electrochromic element of the present invention can be useful in applications such as for sun roofs of automobiles, architectural windows, aircraft windows, the rear windows of vans or trucks, or in sunglasses. The electrochromic element of the invention can be utilized to vary the amount of visible light transmitted through a substrate and also can be utilized to reduce the amount of radiant heat transmitted through windows. Alternatively, the electrochromic element of the invention can be utilized in a mirror to vary the percentage of reflected visible light which would be useful, for example, in an automobile rear view mirror.

Although the present invention has been described in connection with the preferred embodiments, it is understood that modifications and variations may be resorted to without departing from the spirit and scope of the invention. Such modifications are considered to be within the purview and scope of the invention and the appended claims.

What is claimed is:

1. An electrochromic element comprising a pair of conductive electrodes at least one of which is transparent, first and second inorganic electrochromic layers interposed between said pair of conductive electrodes and an ion conducting layer of an electrolyte interposed between said first and second inorganic electrochromic layers, wherein said first and second inorganic electrochromic layers are different and are capable of exhibiting electrochromic properties upon the incorporation of an alkali metal or Ag ion, wherein the electrochromic properties of said first and second inorganic electrochromic layers are complementary, and wherein said ion conducting layer of an electrolyte is a copolymer of ethylene oxide and methyl glycidyl ether and at least one ionizable salt, or a copolymer of ethylene oxide and butylene oxide and at least one ionizable salt, capable of conducting an amount of alkali metal or silver ions between said first and second inorganic electrochromic layers sufficient to cause each of said first and second inorganic electrochromic layers to exhibit a complementary color change, with said ion conducting layer remaining amorphous and transparent.

2. The element of claim 1, wherein said ion conducting layer of a solid polymeric electrolyte comprises a copolymer of ethylene oxide and methyl glycidyl ether and at least one ionizable salt.

3. The element of claim 1, wherein said ion conducting layer of a solid polymeric electrolyte comprises a copolymer of ethylene oxide and butylene oxide and at least one ionizable salt.

4. The element of claim 1, wherein said first inorganic electrochromic layer is WO$_3$.

5. The element of claim 1, wherein said first inorganic electrochromic layer is MoO$_3$.

6. The element of claim 1, wherein said first inorganic electrochromic layer is CrO$_2$.

7. The element of claim 1, wherein said pair of conductive electrodes are fluorine doped tin oxide (SnO$_2$:F).

8. The element of claim 1, wherein said pair of conductive electrodes are indium-tin oxide.

9. An electrochromic element comprising a pair of conductive electrodes at least one of which is transparent, first and second inorganic electrochromic layers interposed between said pair of conductive electrodes and an ion conducting layer of an electrolyte interposed between said first and second inorganic electrochromic layers, wherein said first and second inorganic electrochromic layers are different and are capable of exhibiting electrochromic properties upon the incorporation of an alkali metal or Ag ion, wherein the electrochromic properties of said first and second inorganic electrochromic layers are complementary, and wherein said ion conducting layer of an electrolyte is a polyurethane gel formed by reacting a triisocyanate with a copolymer of ethylene oxide and butylene oxide having a molecular weight ranging between 1,000 and 20,000, or a copolymer of ethylene oxide and methyl glycidyl ether having a molecular weight ranging between 1,000 and 20,000, and at least one ionizable salt, capable of conducting an amount of alkali metal or silver ions between said first and second inorganic electrochromic layers sufficient to cause each of said first and second inorganic electrochromic layers to exhibit a complementary color change, with said ion conducting layer remaining amorphous and transparent.

10. The element of claim 9, wherein said first inorganic electrochromic layer is WO$_3$.

11. The element of claim 9, wherein said first inorganic electrochromic layer is MoO$_3$.

12. The element of claim 9, wherein said first inorganic electrochromic layer is CrO$_2$.

13. The element of claim 9, wherein said pair of conductive electrodes are fluorine doped tin oxide (SnO$_2$:F).

14. The element of claim 9, wherein said pair of conductive electrodes are indium-tin oxide.

15. The element of claim 9, wherein said ion conducting layer of a solid polymeric electrolyte comprises:
a polyurethane gel formed by reacting a triisocyanate with a copolymer of ethylene oxide and butylene oxide having a molecular weight ranging between 1,000 and 20,000; and
at least one ionizable salt.

16. The element of claim 9, wherein said ion conducting layer of a solid polymeric electrolyte comprises:
a polyurethane gel formed by reacting a triisocyanate with a copolymer of ethylene oxide and methyl glycidyl ether having a molecular weight ranging between 1,000 and 20,000; and
at least one ionizable salt.

17. An electrochromic element comprising a pair of conductive electrodes at least one of which is transparent, first and second inorganic electrochromic layers interposed between said pair of conductive electrodes and an ion conducting layer of an electrolyte interposed between said first and second inorganic electrochromic layers, wherein said first and second inorganic electrochromic layers are different and are capable of exhibiting electrochromic properties upon the incorporation of an alkali metal or Ag ion, wherein the electrochromic properties of said first and second inorganic electrochromic layers are complementary, and wherein said ion conducting layer of an electrolyte is a polyurethane network resulting from the reaction of a copolymer of ethylene oxide and another cyclic oxide with an organic polyisocyanate coupling agent, capable of conducting an amount of alkali metal or silver ions between said first and second inorganic electrochromic layers sufficient to cause each of said first and second inorganic electrochromic layers to exhibit a complementary color change, with said ion conducting layer remaining amorphous and transparent.

* * * * *